(12) United States Patent  
Kim et al.

(10) Patent No.: US 12,086,393 B2  
(45) Date of Patent: Sep. 10, 2024

(54) COMMUNICATION METHOD AND DEVICE USING AVATAR IN VIRTUAL SPACE

(71) Applicant: SAMSUNG ELECTRONICS CO., LTD., Suwon-si (KR)

(72) Inventors: Youngrog Kim, Suwon-si (KR); Moonjeong Kim, Suwon-si (KR); Taeyeong Kim, Suwon-si (KR); Wonkyu Sung, Suwon-si (KR); Taeyang Song, Suwon-si (KR); Jonghyuck Yoo, Suwon-si (KR); Changhan Lee, Suwon-si (KR); Jihea Park, Suwon-si (KR); Hyunju Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/312,091

(22) Filed: May 4, 2023

(65) Prior Publication Data

US 2024/0053869 A1 Feb. 15, 2024

Related U.S. Application Data

(63) Continuation of application No. PCT/KR2023/005349, filed on Apr. 20, 2023.

(30) Foreign Application Priority Data

Aug. 12, 2022 (KR) .................. 10-2022-0101218  
Sep. 7, 2022 (KR) .................. 10-2022-0113312

(51) Int. Cl.  
*G06F 3/0484* (2022.01)  
*G06F 3/04815* (2022.01)

(52) U.S. Cl.  
CPC ........ *G06F 3/0484* (2013.01); *G06F 3/04815* (2013.01)

(58) Field of Classification Search  
None  
See application file for complete search history.

(56) References Cited

U.S. PATENT DOCUMENTS 8,396,708 B2    3/2013  Park et al.  
10,334,076 B2 *  6/2019  McKenzie ............. G06F 3/011  
(Continued)

FOREIGN PATENT DOCUMENTS

JP    2021-149407    9/2021  
KR    100610199 B1    8/2006  
(Continued)

OTHER PUBLICATIONS

Search Report and Written Opinion dated Jul. 28, 2023 issued in International Patent Application No. PCT/KR2023/005349.

*Primary Examiner* — Henry Orr  
(74) *Attorney, Agent, or Firm* — Nixon & Vanderhye, P.C.

(57) ABSTRACT

Various embodiments of the disclosure relate to a device and method for communicating using an avatar in a virtual space. To that end, an electronic device may display a first avatar corresponding to a user of the electronic device in a virtual space, display a first graphic user interface (GUI) resource including at least one device capable of establishing connection with the electronic device and, based on receiving an input on the first GUI resource, display a device icon corresponding to the input device in a matching position of the first avatar.

20 Claims, 16 Drawing Sheets

(56) References Cited

U.S. PATENT DOCUMENTS

| | | | |
|---|---|---|---|
| 10,905,956 B2 | 2/2021 | Fajt et al. | |
| 11,348,298 B2 | 5/2022 | Weston | |
| 11,481,965 B2 | 10/2022 | Ahn et al. | |
| 11,733,956 B2 | 8/2023 | Sommer et al. | |
| 2004/0179039 A1* | 9/2004 | Blattner | H04L 51/00 |
| | | | 715/758 |
| 2014/0047027 A1* | 2/2014 | Moyers | G06F 9/452 |
| | | | 709/204 |
| 2016/0042402 A1* | 2/2016 | Gadre | G06Q 30/0269 |
| | | | 705/14.66 |
| 2018/0296923 A1* | 10/2018 | Nims | A63F 13/65 |
| 2021/0055801 A1 | 2/2021 | Lee | |
| 2021/0311893 A1* | 10/2021 | Pohl | G06T 7/70 |
| 2022/0068030 A1 | 3/2022 | Rozenblit | |
| 2023/0040573 A1* | 2/2023 | Bhatti | G06T 19/006 |
| 2023/0388453 A1* | 11/2023 | Chalmers | G06F 3/0346 |

FOREIGN PATENT DOCUMENTS

| | | |
|---|---|---|
| KR | 101119045 B1 | 3/2012 |
| KR | 101558553 B1 | 10/2015 |
| KR | 10-2019-0094022 | 8/2019 |
| KR | 10-2073413 | 2/2020 |
| KR | 10-2021-0023397 | 3/2021 |
| KR | 10-2021-0036975 | 4/2021 |
| KR | 10-2015-0118036 | 10/2021 |
| KR | 10-2021-0127054 | 10/2021 |
| KR | 10-2021-0148591 | 12/2021 |
| WO | 2020/051111 | 3/2020 |

\* cited by examiner

PAIRED AND CONNECTION-ESTABLISHED

PAIRED BUT NOT CONNECTION-ESTABLISHED

PAIRED AND CONNECTION-ESTABLISHED

PAIRED BUT NOT CONNECTION-ESTABLISHED

COMMUNICATION METHOD AND DEVICE USING AVATAR IN VIRTUAL SPACE

CROSS-REFERENCE TO RELATED APPLICATIONS

This application is a continuation of International Application No. PCT/KR2023/005349 designating the United States, filed on Apr. 20, 2023, in the Korean Intellectual Property Receiving Office, which claims priority to Korean Patent Application Nos. 10-2022-0101218 filed on Aug. 12, 2022, and 10-2022-0113312 filed on Sep. 7, 2022, in the Korean Intellectual Property Office, the disclosures of all of which are incorporated by reference herein in their entireties.

BACKGROUND

Field

The disclosure relates to an electronic device and method for performing communication using an avatar in a virtual space.

Description of Related Art

A user may be immersed in a three-dimensional (3D) environment, e.g., a virtual reality space (or virtual space), created by an electronic device. The user may explore and interact with a 3D environment. As an abstract expression for displaying input/output in executing an application, an avatar and an icon may be provided in a virtual space, and the user may interact, such as moving an avatar, by inputting commands and/or instructions through a keyboard, a mouse, a touch, a joystick, and the like.

As the number of peripheral devices (or other devices such as IoT devices) of an electronic device (e.g., mobile device) increases, intuitive and efficient user interface for controlling or communicating with the peripheral devices on the electronic device is needed.

SUMMARY

Embodiments of the disclosure provide an electronic device communicating in a virtual space using an avatar and a method thereof. When an avatar and at least one part of the avatar corresponding to the user of the electronic device is displayed in the virtual space, a device selection Graphic User Interface (GUI) resource (e.g., device selection window) including at least one device capable of communicating with the electronic device is displayed, and a user input (e.g., selection input) to the device selection GUI resource is received, the device may intuitively display, e.g., a device icon corresponding to the device, input to a matching position of the avatar which corresponds to the position where the device is worn by the user.

Embodiments of the disclosure may provide a method and device for using an avatar and a virtual space that hosts the avatar, including displaying the device status, executing and/or stopping a device, and communicating with another user device.

According to an example embodiment of the disclosure, an electronic device may comprise: a memory storing executable instructions and at least one processor electrically connected to the memory and capable of accessing the memory to execute the instructions. At least one processor may be configured to control a display to display a first avatar corresponding to a user of the electronic device in a virtual space. At least one processor may be configured to control the display to display a first GUI resource including at least one device capable of establishing connection with the electronic device. At least one processor may, upon receiving an input on the first GUI resource, be configured to control the display to display a second GUI resource corresponding to the input device in a matching position of the first avatar.

According to an example embodiment of the disclosure, a method for communication using an avatar in a virtual space may comprise detecting or pairing at least one device capable of establishing connection with an electronic device. The method may comprise displaying a first avatar corresponding to a user of the electronic device in a virtual space. The method may comprise displaying a first GUI resource including the at least one device capable of establishing connection with the electronic device. The method may comprise, upon receiving an input on the first GUI resource, displaying a second GUI resource corresponding to the input device in a matching position of the first avatar.

Further, according to an example embodiment of the disclosure, a non-transitory computer-readable recording medium having recorded thereon a program for performing the method may be included.

According to various example embodiments of the disclosure, it is possible to provide a multi-device experience (MDE) service using an avatar in virtual space.

According to various example embodiments of the disclosure, it is possible to provide a user interface that may establish connection between an electronic device and a peripheral device using an avatar in a virtual space and match the part of the avatar (or "avatar part" such as head, left arm, or right foot of the avatar), where the peripheral device may be mounted, to the peripheral device. The electronic device may display an avatar including the matched avatar part and the GUI resource (e.g., peripheral device identification icon) corresponding to the peripheral device in the virtual space. The user may intuitively match the peripheral device to the position where the peripheral device is worn by the user through the avatar and intuitively recognize information (e.g., whether the peripheral device is worn or whether connection is established) related to the peripheral device matched with each avatar part. The electronic device may provide an avatar and a virtual space including the avatar, as a user interface, to communication between the peripheral device and another user device.

Further, according to various example embodiments of the disclosure, the user interface corresponding to a predetermined function provided by the connected peripheral device is displayed in the virtual space including the avatar so that usability of the user interface may be increased through the virtual space. For example, if the user wears a peripheral device, e.g., earphone or watch, the GUI resource (e.g., music share icon, heartrate/calorie information on watch) corresponding to the function provided by the peripheral device may be displayed in the virtual space where the avatar resides.

Effects of the present disclosure are not limited to the foregoing, and other unmentioned effects will be apparent to one of ordinary skill in the art from the following description.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Figure 1:
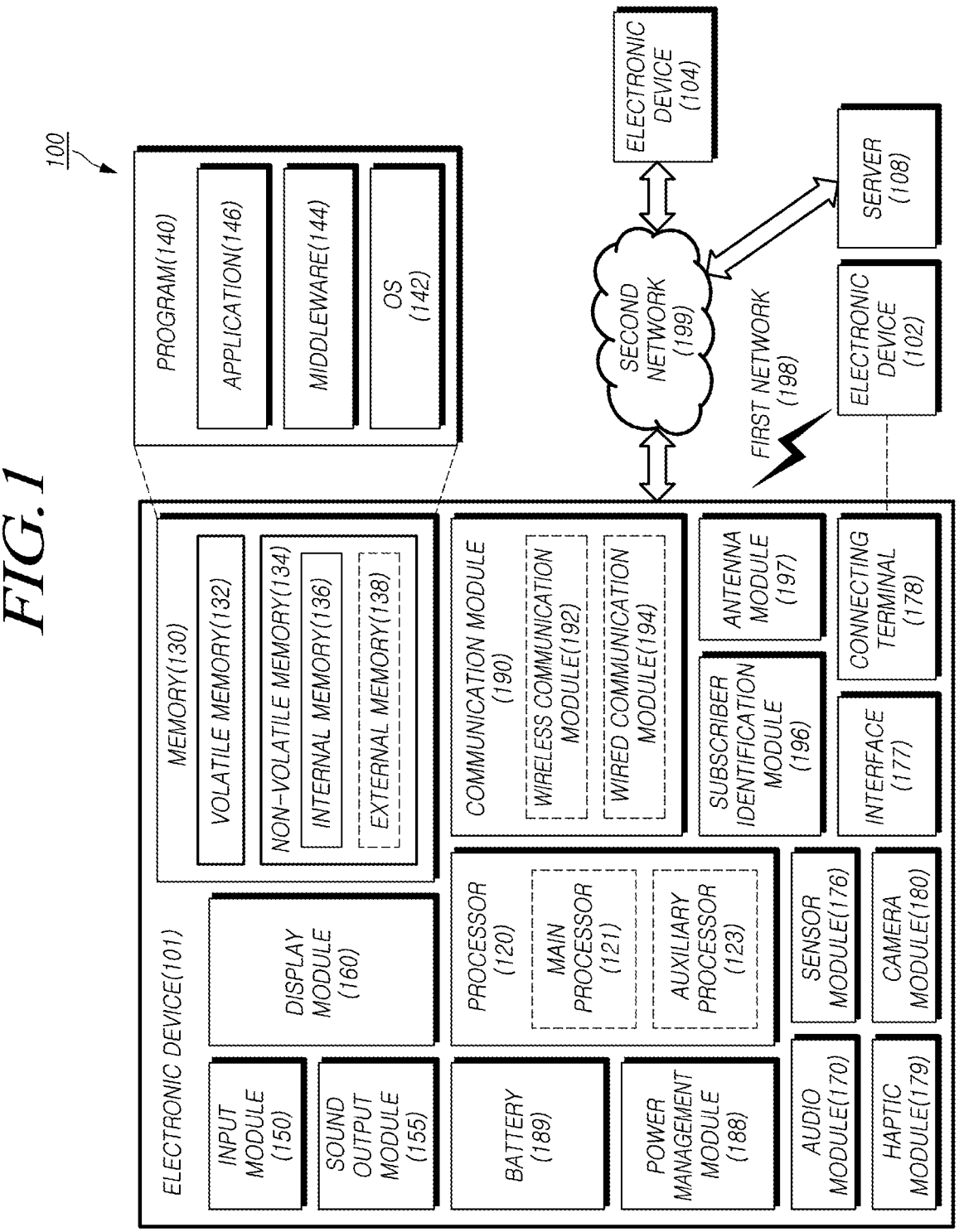
FIG. 1 is a diagram illustrating an example electronic device in a network environment according to various embodiments.

Embodiments of the present disclosure are now described with reference to the accompanying drawings in greater detail. However, the disclosure may be implemented in other various forms and is not limited to the embodiments set forth herein. The same or similar reference denotations may be used to refer to the same or similar elements throughout the disclosure and the drawings. Further, for clarity and brevity, description of well-known functions and configurations in the drawings and relevant descriptions may be omitted.

The structure or type of electronic device shown in the disclosure is merely an example, and the scope of the various example embodiments is not limited to a specific structure or type of electronic device, but various changes or modifications thereto or applications are also possible. The technical features of the disclosure are not limited to specific embodiments but may rather be applied to all types of electronic devices (e.g., smart phones, mobile devices, laptops, tablets, or wearable devices) and their operation methods.

FIG. 1 is a diagram illustrating an example electronic device in a network environment according to various embodiments.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
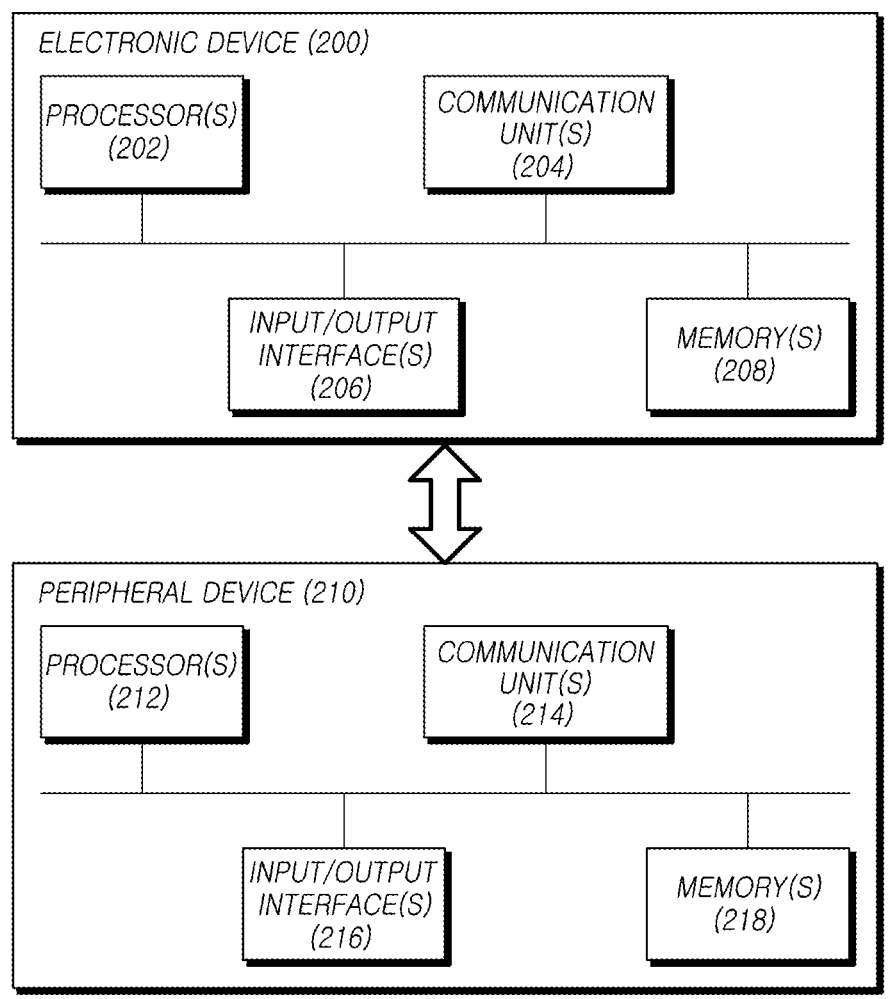
FIG. 2 is a block diagram illustrating an example configuration of an electronic device and a peripheral device according to various embodiments.

FIG. 2 is a block diagram illustrating an example configuration of an electronic device and a peripheral device according to various embodiments.

Referring to FIG. 2, according to an embodiment, an electronic device 200 may include a processor(s) (e.g., including processing circuitry) 202, a communication unit(s) (e.g., including communication circuitry) 204, an input/output interface(s) (e.g., including interface circuitry) 206, and a communication bus(es) for interconnecting these various other components (not shown). The electronic device 200 may include a memory(s) 208 connected to the bus(es) and capable of storing information and instructions to be executed by the processor(s) 202. The electronic device 200 may correspond to the electronic device 101 of FIG. 1 but may include additional components other than the illustrated components or may omit at least one of the illustrated components. For example, the communication unit(s) 204 may correspond to the communication module (one of the communication modules 190, 192 or 194) of FIG. 1. The processor(s) 202 may correspond to the processor (one of 120, 121, or 123) of FIG. 1.

The communication unit(s) 204 may include various communication circuitry and transmit/receive signals (e.g., media data or control signals) to/from external devices (e.g., the peripheral device 210), such as other wireless devices, portable devices, or servers. The media data may include, but not limited to, video, image, and audio. The communication unit(s) 204 may include, but not limited to, at least one of a short-range wireless communication module, a wireless LAN communication module, a cellular communication module, and a wired communication module. The short-range wireless communication module may include, but not limited to, Bluetooth, Bluetooth low energy, ultra-wideband (UWB), near field communication (NFC), Zigbee, infrared data association (IrDA), and the like. The short-range wireless communication module may be configured to wirelessly perform short-range communication with the peripheral device 210 under the control of the processor(s) 202. The wireless LAN communication module may include, e.g., Wi-Fi, Wi-Fi direct, and the like and may support the wireless LAN standard (IEEE802.11x) of the institute of electrical and electronics engineers (IEEE). The wireless LAN communication module may be wirelessly connected to an access point (AP) under the control of the processor(s) 202.

Referring to FIG. 2, a peripheral device 210 may include a processor(s) (e.g., including processing circuitry) 212, a communication unit(s) (e.g., including communication circuitry) 214, an input/output interface(s) (e.g., including interface circuitry) 216, and a communication bus(es) for interconnecting these various other components (not shown). The peripheral device 210 may include a memory(s) 218 connected to the bus(es) and capable of storing information and instructions to be executed by the processor(s) 212. The peripheral device 210 may include a sensor unit(s) including various sensors (not shown) and a power supply unit(s) including power supply(ies) (not shown). The peripheral device 210 may include additional components in addition to the illustrated components or may omit at least one of the illustrated components.

The peripheral device 210 may include, but not limited to, a head mounted display (HMD), a wearable device including a watch, earphones, headphones, smart clothing, and smart shoes, a robot, a head-up display (HUD) provided in a vehicle, a smartphone, a computer, a television, a home appliance, digital signage, or a vehicle.

The communication unit(s) 214 may include various communication circuitry and transmit/receive signals (e.g., media data or control signals) to/from external devices (e.g., the electronic device 200), such as other wireless devices, portable devices, or media servers. The media data may include, but not limited to, video, image, and audio. The communication unit(s) 214 may include, but not limited to, at least one of a short-range wireless communication module, a wireless LAN communication module, a cellular communication module, and a wired communication module. The short-range wireless communication module may include Bluetooth, Bluetooth low energy, ultra-wideband (UWB), near field communication (NFC), Zigbee, infrared data association (IrDA), and the like. The short-range wireless communication module may be configured to wirelessly perform short-range communication with the electronic device 200 under the control of the processor(s) 212. The wireless LAN communication module may include, e.g., Wi-Fi, Wi-Fi direct, and the like, and may support the wireless LAN standard (IEEE802.11x) of the institute of electrical and electronics engineers (IEEE). The wireless LAN communication module may be wirelessly connected to an access point (AP) under the control of the processor(s) 212.

The processor(s) 212 may include various processing circuitry and control the components of the peripheral device 210 to perform various operations. For example, the processor(s) 212 may be configured to control and/or perform procedures, such as obtaining video/image/audio, decoding (video/image/audio), generating/processing/transmitting metadata (e.g., peripheral device 210 information), and the like. The processor(s) 212 may include a storage and processing circuit unit to support the operation of peripheral device 210. The storage and processing circuit unit may include a storage such as non-volatile memory (e.g., flash memory, or other electrically programmable ROM configured to form a solid state drive (SSD)) or volatile memory (e.g., static or dynamic RAM). The processing circuit unit in the processor(s) 212 may be used to control the operation of the peripheral device 210. The processing circuit unit may be based on at least one of a central processing unit (CPU), a graphic processing unit (GPU), a micro controller unit (MCU), a sensor hub, a supplementary processor, a communication processor, an application processor, an application specific integrated circuit (ASIC), or field programmable gate arrays (FPGA) and may include at least one core.

The memory(s) 218 may include a storage medium used by the peripheral device 210 and may store at least one of data, parameters, programs, codes, and commands necessary for driving the peripheral device 210. The data may include configuration information and/or variables used in the protocol, configuration, control and other functions of the peripheral device 210, including operations correspond to, or including, any one of methods and/or procedures described by way of non-limiting example in the disclosure. The program may include an operating system (OS) program and various application programs. The memory(s) 218 may include non-volatile memory, volatile memory, or a combination thereof. The memory(s) 218 may interface with a memory slot that enables insertion and removal of removable memory cards in one or more formats (e.g., SD card, Memory stick, compact flash, etc.). The memory(s) 218 may provide the stored data according to a request of the processor(s) 212.

The input/output interface(s) 216 may include various circuitry and obtain control information or data from an external source (e.g., an external device or user) and send the obtained data. The input/output interface(s) 216 may include a camera, a microphone, a user input unit, a display unit, a speaker, and/or a haptic module.

The sensor unit may include various sensors and may detect the device state of the peripheral device 210, ambient environment information, user information, and the like. The sensor unit may include at least one of a proximity sensor, an illuminance sensor, an acceleration sensor, a magnetic sensor, a gyro sensor, an inertia sensor, a red-green-blue (RGB) sensor, an infrared (IR) sensor, a fingerprint recognition sensor, an ultrasonic sensor, an optical sensor, a microphone, and/or a radar.

The power supply unit may include a power supply and supply power to the peripheral device 210 and may include a wired/wireless charging circuit or a battery.

The input/output interface(s) 216 may include various circuitry and obtain commands for manipulating the peripheral device 210 from the user or an external device. The processor(s) 212 may drive the peripheral device 210 according to the driving commands from the user or the external device. For example, when the user watches a movie or news through the peripheral device 210, the processor(s) 212 may transmit content request information to another device (e.g., the electronic device 200 or a media server) through the communication unit(s) 214. The communication unit(s) 214 may download/stream content, such as movies and news, from the other device (e.g., the electronic device 200 or the media server) to the memory(s) 218. The processor(s) 212 may control and/or perform procedures, such as video/image obtaining, (video/image) decoding, and metadata processing, on the content, and control to generate and output objects based on information about the ambient space or real objects obtained through the sensor unit/the input/output interface(s) 216.

The peripheral device 210 may be wirelessly connected to the electronic device 200 through the communication unit(s) 214. The operation of the peripheral device 210 may be controlled by the electronic device 200. For example, the electronic device 200 may operate as a controller for the peripheral device 210.

The processor(s) 202 of the electronic device 200 may obtain information capable of identifying at least one peripheral device 210 detected and/or paired through the communication unit(s) 204. Pairing may refer, for example, to, but is not limited to, a state in which the electronic device 200 and the peripheral device 210 are aware of each other's presence and share the authentication key to be used for an authentication process so that an encrypted connection may be established therebetween. The processor(s) 202 may establish a connection with the selected peripheral device based on an external input (e.g., user input) through the communication unit(s) 204. Connection establishment may refer, for example, to, but is not limited to, a state in which the electronic device 200 and the peripheral device 210 share a wireless channel and are able to transmit/receive data to/from each other.

The processor(s) 202 of the electronic device 200 may control a display to display a first avatar 310 including at least one avatar part (e.g., head, left arm, or right foot) in the virtual space. As used herein, when a processor is recited as "displaying" or the processor may "display", it will be understood that the processor itself may not display images itself, but that the processor may control a display to display various images. The processor(s) 202 may display at least one peripheral device matching GUI resource (e.g., '+icon 340 of each avatar part) in the virtual space. The at least one peripheral device matching GUI resource may correspond to each avatar part. The at least one peripheral device matching GUI resource is described below with reference to FIG. 4. The processor(s) 202 may display the device selection GUI resource based on an external input (e.g., click on the '+' icon) using at least one peripheral device matching GUI resource and select a peripheral device to match to each avatar part from at least one peripheral devices. The device selection GUI resource may include at least one device capable of establishing connection with the electronic device 200. The at least one device may include at least one device that is paired with the electronic device 200, has previously connected to the electronic device 200, or has been pre-configured based on an external input (e.g., user input). The device selection GUI resource may include at least one of an icon, text, or object indicating the at least one device. The processor(s) 202 may match the selected peripheral device to the avatar part corresponding to the externally input peripheral device matching GUI resource. The peripheral device matching position (or avatar part) in the avatar may be the position where the selected peripheral device is worn by the user.

The processor(s) 202 may display the peripheral device GUI resource corresponding to the matched peripheral device in each avatar part matched with the peripheral device. The peripheral device GUI resource may include at least one of an icon, text, object, or image capable of identifying the peripheral device. The peripheral device GUI resource may further include a state GUI element capable of identifying the state of the peripheral device. The state of the peripheral device may include a state in which a connection with the electronic device 200 is established (e.g., state in which connection is established and operable) and a state in which no connection with the electronic device 200 is established. The state GUI element may include at least one color of the avatar part matched with the peripheral device, brightness of at least one of the icon, text, object, or image capable of identifying the peripheral device, and icon capable of identifying the state of the peripheral device. The peripheral device GUI resource is described in greater detail below with reference to FIG. 5, and the state GUI element is described in greater detail below with reference to FIGS. 6, 7 and 8. The processor(s) 202 may control the display to display the image of the peripheral device to flicker when the state of the peripheral device 210 matched to the avatar part is changed.

Figure 9:
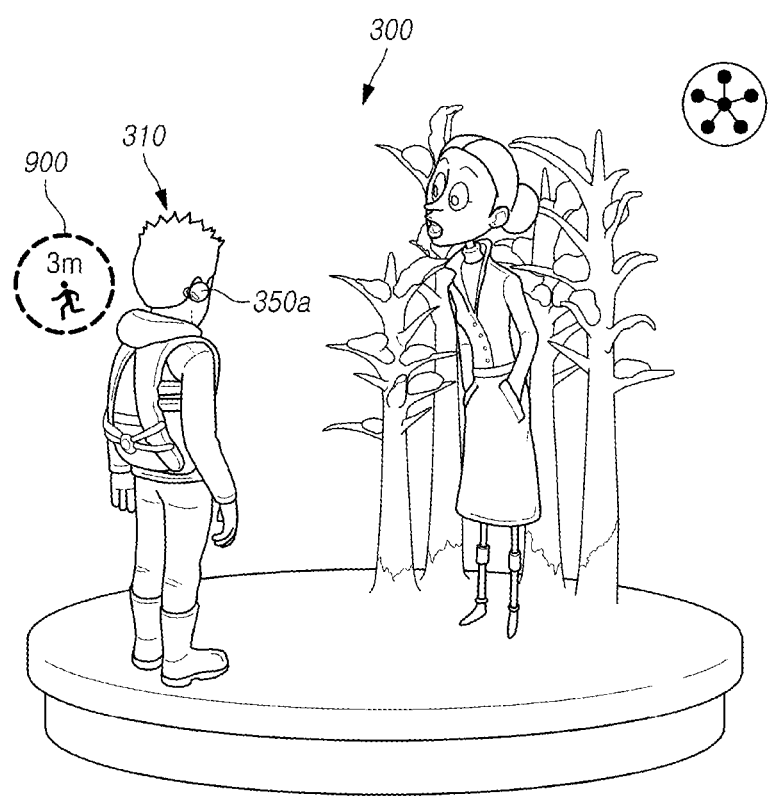
FIG. 9 is a diagram illustrating a virtual space displaying an away GUI resource according to various embodiments.

The peripheral device GUI resource may include an away GUI resource 900 (refer to FIG. 9). The processor(s) 202 may determine whether the distance to each peripheral device 210 matched to the avatar part exceeds a predetermined (e.g., specified) distance using the communication unit(s) 204. Upon determining that the distance to the peripheral device 210 exceeds (or is greater than) the predetermined distance, the processor(s) 202 may display the away GUI resource on the avatar part matched with the peripheral device 210 the distance to which is determined to exceed (or is greater than) the predetermined distance. The away GUI resource is described in greater detail below with reference to FIG. 9.

The processor(s) 202 may obtain or identify at least one participant (e.g., friend) and at least one participant device joining the virtual space based on an external input (e.g., user input). The processor(s) 202 may control the input/output interface(s) 206 to display a first avatar 310 corresponding to the user of the electronic device and at least one second avatar 320 corresponding to the at least one participant in the virtual space.

When the peripheral device 210 has established connection with the electronic device 200, the processor(s) 202 may display in the virtual space at least one function GUI resource capable of executing or stopping a predetermined function of the peripheral device 210. For example, when the peripheral device 210 is a watch, and the watch has established connection with the electronic device 200, the processor(s) 202 may control the input/output interface(s) 206 to display at least one of exercise heartrate information provided by the watch and information about the calorie consumed by the user of the electronic device 200 in the virtual space. At least one function GUI resource is described in greater detail below with reference to FIGS. 10, 11 and 12.

The processor(s) 202 may generate, based on external input, a virtual space database including at least one second virtual space and at least one peripheral device type information corresponding to each second virtual space. For example, the processor(s) 202 may generate a virtual space database including a database record corresponding to the peripheral device (e.g., watch) in a fitness virtual space.

The processor(s) 202 may select one second virtual space among the at least one second virtual space based on an external input (e.g., user input). The processor(s) 202 may control to display the selected second virtual space through the input/output interface(s) 206. The processor(s) 202 may determine whether at least one peripheral device corresponding to at least one peripheral device type information corresponding to the selected second virtual space has connection established. When the at least one peripheral device corresponding to at least one piece of peripheral device type information corresponding to the selected second virtual space has connection established, the processor(s) 202 may control the input/output interface(s) 206 to display at least one second function GUI resource capable of executing or stopping the predetermined function provided by the at least one connected peripheral device in the second virtual space. A method for providing a user interface using an avatar in performing a predetermined function provided by a peripheral device in a virtual space selected from among at least one virtual space is described in greater detail below with reference to FIG. 13. A user interface for establishing a connection with a peripheral device corresponding to a selected virtual space and at least one function GUI resource associated with a predetermined function provided by the peripheral device are described in greater detail below with reference to FIG. 14.

The processor(s) 202 may obtain or identify at least one participant (e.g., friend) joining the second virtual space based on an external input (e.g., user input). The processor(s) 202 may control the input/output interface(s) 206 to display a first avatar corresponding to the user of the electronic device and at least one second avatar corresponding to the at least one participant in the second virtual space. The second virtual space where the at least one participant is invited is described below with reference to FIG. 15. The processor(s) 202 may control the input/output interface(s) 206 to display at least one function GUI resource associated with a predetermined frequency provided by the respective peripheral device 210 of the at least one invited participant in the second virtual space. The virtual space displaying at least one function GUI resource associated with the predetermined function, provided by the respective peripheral device 210 of the at least one invited participant is described below with reference to FIG. 16.

Figure 3:
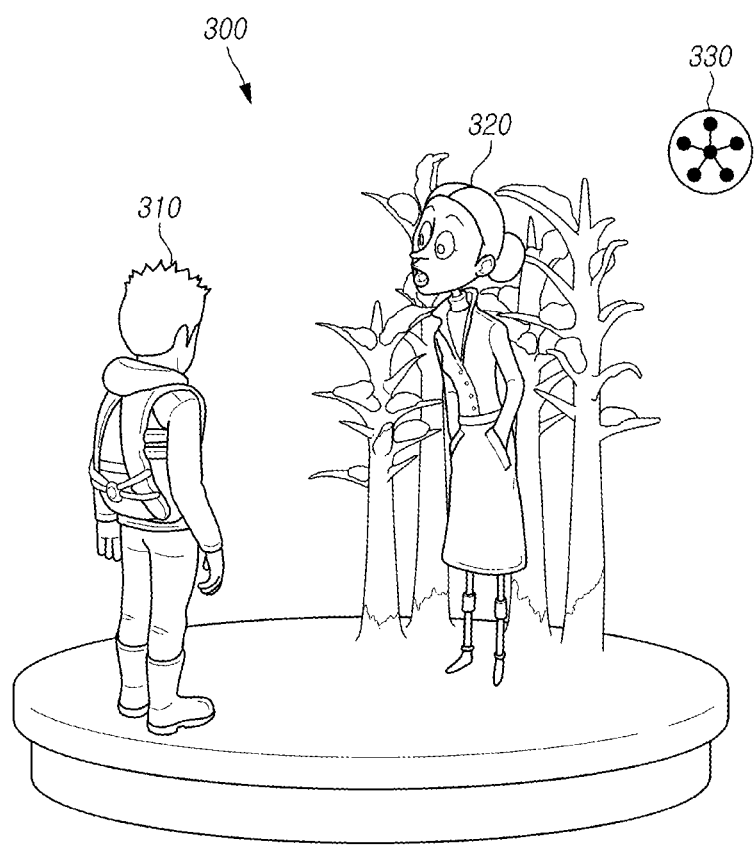
FIG. 3 is a diagram illustrating a virtual space displaying a registration icon for matching a part of an avatar, where a peripheral device may be mounted, to the peripheral device according to various embodiments.

FIG. 3 is a diagram illustrating a virtual space displaying a registration icon for matching a part of an avatar where a peripheral device may be mounted to the peripheral device according to various embodiments.

Referring to FIG. 3, the electronic device 200 may display a first avatar 310 including at least one avatar part (e.g., head, left arm, or right foot) in the virtual space 300. The first avatar 310 may correspond to the user of the electronic device 200. The electronic device 200 may display at least one second avatar 320 corresponding to at least one participant (e.g., friend or family member) in the virtual space 300. In the illustrated example, the electronic device 200 may display the virtual space including the second avatar 320, but the electronic device 200 may display only the first avatar 310 in the virtual space 300. The first avatar 310 and the second avatar 320 may be created by any avatar creation application. For example, the first avatar 310 may be created based on an emoji and created to be diversely customized to reflect the user's appearance of the electronic device 200. The first avatar 310 and/or the second avatar 320 may be created inside the electronic device 200 or may be created by an external device. When the first avatar 310 and/or the second avatar 320 is created by an external device, the electronic device 200 may obtain the first avatar 310 and/or the second avatar 320 from the external device.

The electronic device 200 may display a registration icon 330 for matching the avatar part where the peripheral device may be mounted with the peripheral device in the virtual space 300. It will be appreciated by one of ordinary skill in the art that the shape of the registration icon 330 is not limited.

Figure 4:
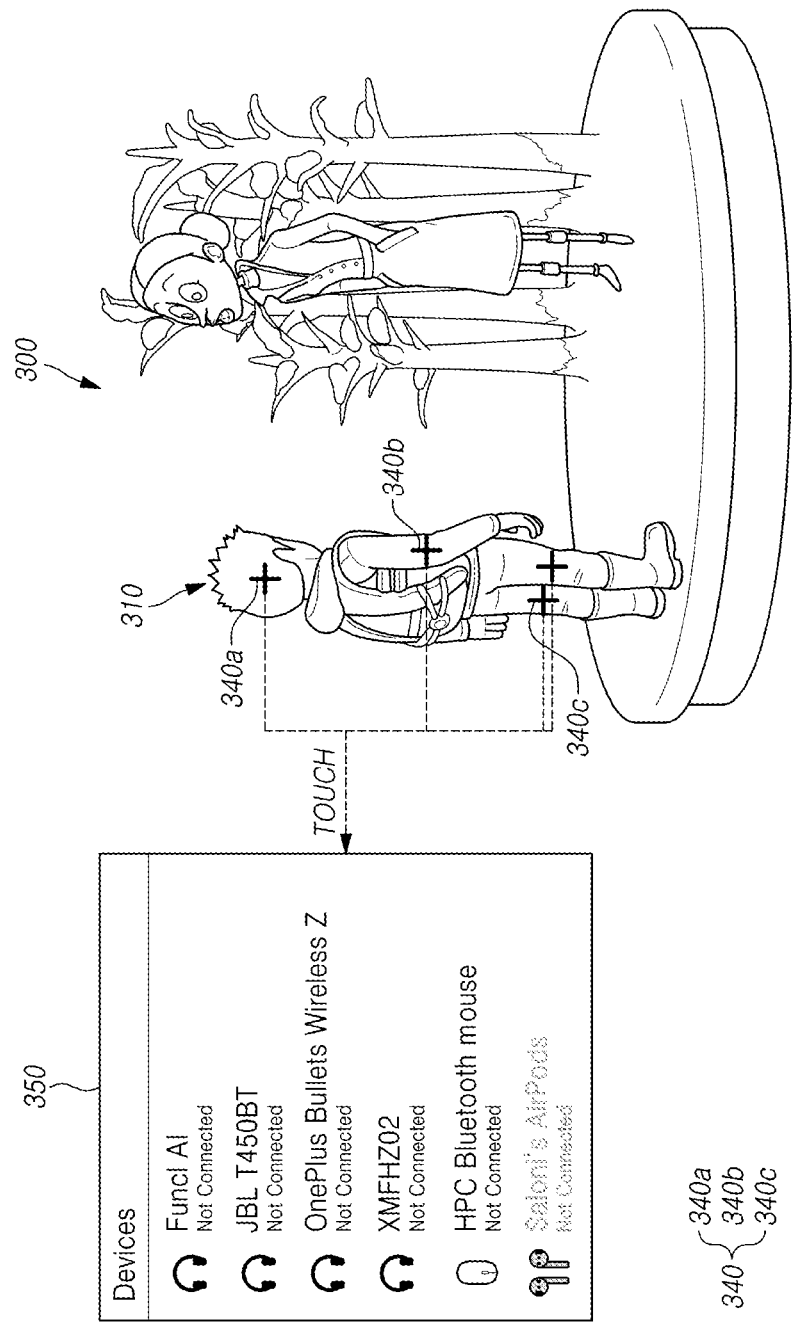
FIG. 4 is a diagram illustrating a virtual space displaying at least one peripheral device matching GUI resource according to various embodiments.

FIG. 4 is a diagram illustrating a virtual space displaying at least one peripheral device matching GUI resource according to various embodiments.

The virtual space 300 of FIG. 4 may correspond to the virtual space 300 in the above-described figures. In the operation of displaying the virtual space 300 of FIG. 4, any discussions that may be redundant to those described above in connection with the figures may not be repeated. Some of the operations of displaying the virtual space 300 of FIG. 4 may be omitted. Operations not shown in FIG. 4 may be added.

Referring to FIG. 4, the electronic device 200 may display at least one peripheral device matching GUI resource 340 in the virtual space 300. The at least one peripheral device matching GUI resource 340 may correspond to each avatar part. In the illustrated example, the first avatar 310 may include at least one avatar part corresponding to at least any one of a head, both arms, and both legs. The electronic device 200 may display the corresponding peripheral device matching GUI resources 340a, 340b, and 340c on the respective avatar parts.

The electronic device 200 may display a device selection GUI resource based on an external input (e.g., user input) using at least one peripheral device matching GUI resource. For example, the device selection GUI resource may be in the form of a device list window including at least one peripheral device capable of communication connection with the electronic device 200. At least one peripheral device may include at least one peripheral device that is detected and/or paired through the communication unit(s) 204 of the electronic device 200, has previously been connected with the electronic device 200, or has been pre-configured based on an external input (e.g., user input). The device selection GUI resource may include at least one of an icon, text, or object indicating the at least one peripheral device.

Referring to FIG. 4, the electronic device 200 may select a peripheral device to match among at least one peripheral device based on an external input (e.g., user input) using the device selection GUI resource 350. The electronic device 200 may obtain information capable of identifying at least one peripheral device 210 detected and/or paired through the communication unit(s) 204. The electronic device 200 may obtain information capable of identifying a peripheral device that is not currently detected and/or paired but has previously been detected and/or paired. FIG. 4 illustrates that five peripheral devices (e.g., 'Fund AI', 'JBL T450BT', 'OnePlus Bullets Wireless Z', AMFHZ02', and 'HPC Bluetooth mouse') are detected and/or paired. Further, in the illustrated example, as one peripheral device is displayed with a different brightness, it may be shown that the one peripheral device (e.g., "Saloni's AirPods") has been detected and/or paired in the past.

In the illustrated example, when obtaining a touch input on a peripheral device matching GUI resource (e.g., 340a) from the user, the electronic device 200 may display identification information about at least one detected and/or paired peripheral device 210. The electronic device 200 may obtain a user input for selecting the peripheral device (e.g., earphone) to match among at least one peripheral device 210 using the device selection GUI resource 350. The electronic device 200 may match the selected peripheral device (e.g., earphone) to the avatar part (e.g., head) corresponding to the touched peripheral device matching GUI resource (e.g., 340a).

Figure 5:
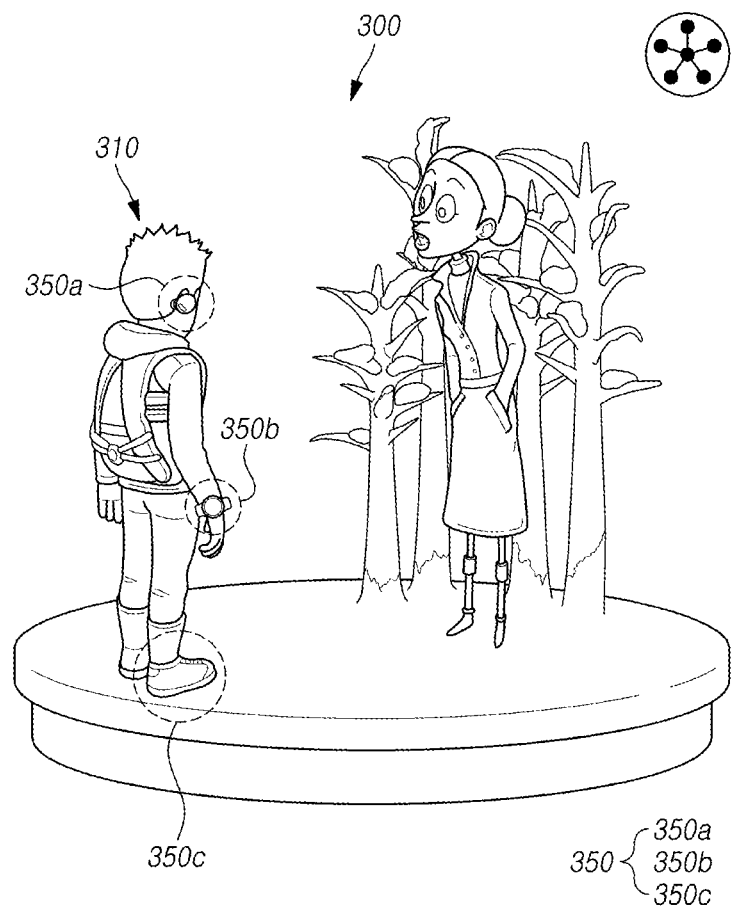
FIG. 5 is a diagram illustrating a virtual space displaying a peripheral device GUI resource corresponding to a matched peripheral device in each avatar part according to various embodiments.

FIG. 5 is a diagram illustrating a virtual space displaying a peripheral device GUI resource corresponding to a matched peripheral device in each avatar part according to various embodiments.

The virtual space 300 of FIG. 5 may correspond to the virtual space 300 in the above-described figures. In the operation of displaying the virtual space 300 of FIG. 5, any discussions that may be redundant to those described above in connection with the figures may not be repeated. Some of the operations of displaying the virtual space 300 of FIG. 5 may be omitted. Operations not shown in FIG. 5 may be added.

The electronic device 200 may display the peripheral device GUI resource 350 for the corresponding peripheral devices, in which is matched to each avatar part(s). The peripheral device GUI resource 350 may include peripheral device images (or icons) 350*a*, 350*b*, and 350*c* capable of identifying the peripheral devices. In the illustrated example, an earphone image 350*a* capable of identifying an earphone is matched to the head of the first avatar 310, a watch image 350*b* capable of identifying a watch is matched to the right arm, and a right shoe image 350*c* capable of identifying the right shoe is matched to the right foot may be displayed in the virtual space 300.

The electronic device 200 may display at least one of the peripheral device images 350 or each avatar part matched to the peripheral device to flicker to indicate a change in the state of the peripheral device. The state of the peripheral device may include a state in which a connection with the electronic device 200 is established and a state in which no connection with the electronic device 200 is established. In the illustrated example, the right shoe, which was paired but has not established connection subsequently establishes connection, the electronic device 200 may display at least one of the right foot part of the avatar or the right shoe image 350*c* to flicker, indicating that the right shoe has established connection. It will be understood by one of ordinary skill in the art that to indicate the change in the state of the peripheral device in the virtual space 300 is not limited to the use of flickering and may be displayed in various ways.

Figure 6:
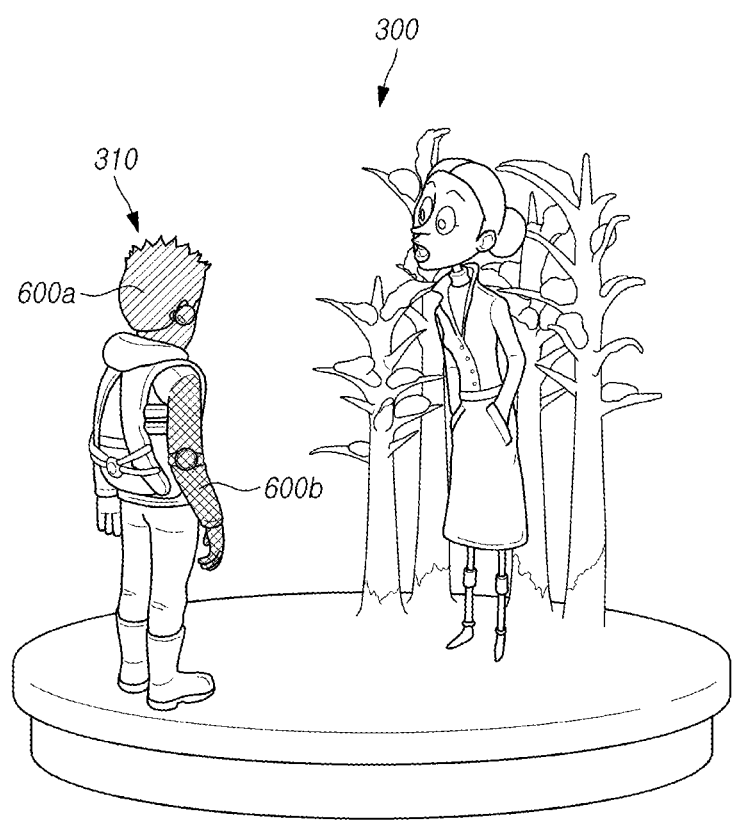
FIGS. 6, 7, and 8 are diagrams illustrating a virtual space displaying a state GUI element for identifying the state of a peripheral device according to various embodiments.
Figure 6:
Figure 6:
Figure 7:
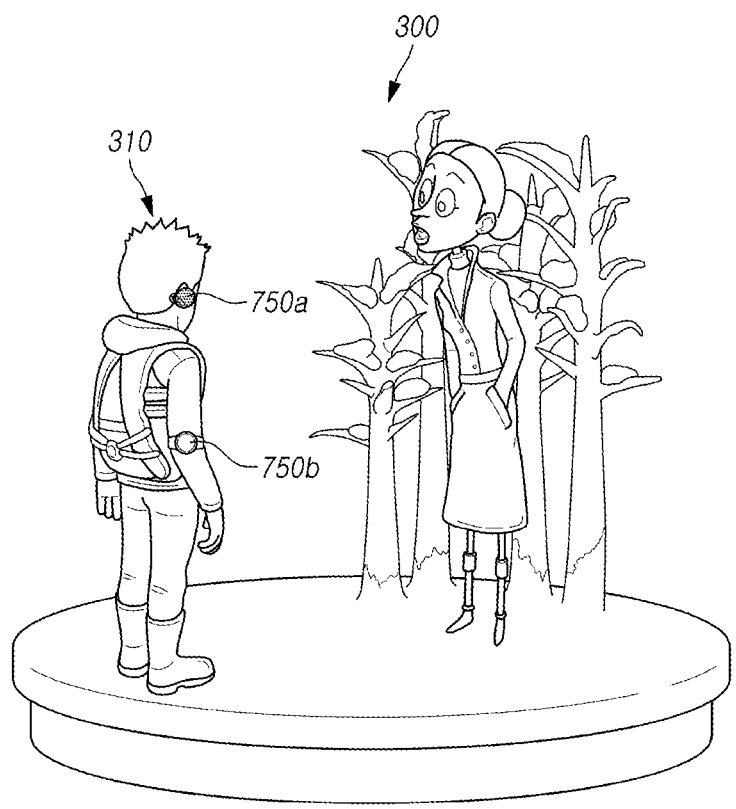
Figure 7:
Figure 7:
Figure 8:
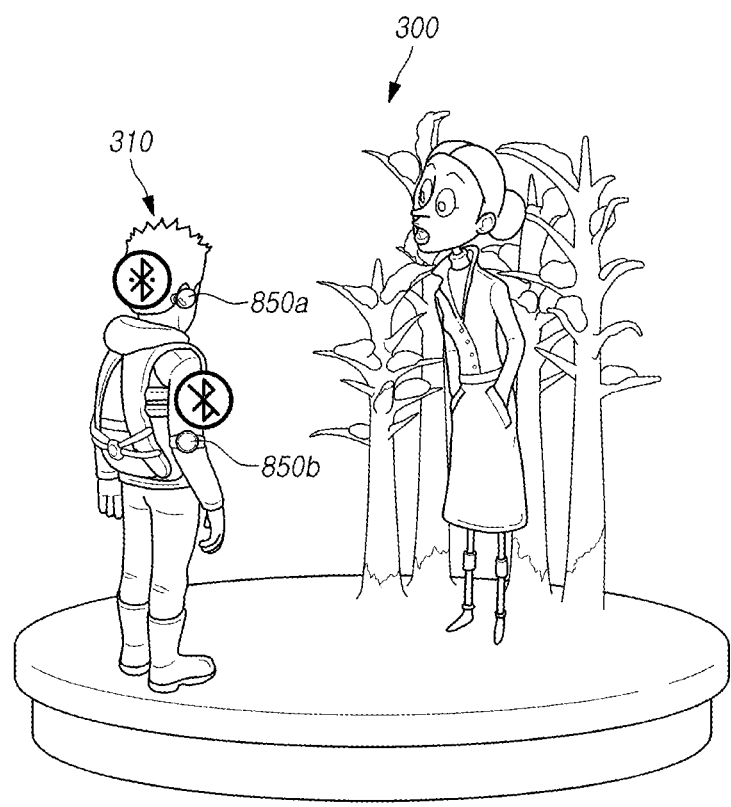

FIGS. 6, 7, and 8 are diagrams illustrating a virtual space displaying a state GUI element for identifying the state of a peripheral device according to various embodiments.

The virtual space 300 of FIGS. 6, 7 and 8 may correspond to the virtual space 300 in the above-described figures. In the operation of displaying the virtual space 300 of FIGS. 6, 7 and 8, any discussions that may be redundant to those described above in connection with the figures may not be repeated. Some of the operations of displaying the virtual space 300 of FIGS. 6, 7 and 8 may be not be shown/described. Operations not shown in FIGS. 6, 7 and 8 may be added.

The electronic device 200 may display a state GUI element capable of identifying the state of the peripheral device corresponding to peripheral devices, which is matched to each avatar part. The state of the peripheral device may include a state in which a connection with the electronic device 200 is established and a state in which no connection with the electronic device 200 is established. The state GUI element may include at least one of the icon capable of identifying the state of the peripheral device and brightness of the above-described peripheral device image in FIG. 5 and the color of the avatar part matched with the peripheral device.

Referring to FIG. 6, the state of being paired and connection-established with the earphone matched to the head part 600*a* may be indicated by displaying the avatar head part 600*a* in green. Further, the state of being paired but with no established connection with the watch matched to the right arm part 600*b* may be indicated by displaying the avatar right arm part 600*b* in red. It will be understood by one of ordinary skill in the art that the color of the avatar part is not limited thereto and may vary.

Referring to FIG. 7, the state of being paired and connection-established with the earphone matched to the head part may be indicated by displaying the earphone image 750*a* in a predetermined first brightness (e.g., dark brightness). Further, the state of being paired but with no established connection with the watch matched to the right arm part may be indicated by displaying the watch image 750*b* in a predetermined second brightness (e.g., light brightness). It will be appreciated by one of ordinary skill in the art that the brightness of the peripheral device image is not limited to a specific brightness and may vary.

Referring to FIG. 8, the state of being paired and connection-established with the earphone matched to the head part may be indicated by displaying an icon 850*a* capable of identifying the "paired and connection-established state". Further, the state of being paired but with no established connection with the watch matched to the right arm part may be indicated by displaying an icon 850*b* capable of identifying the "paired but no connection." It will be understood by one of ordinary skill in the art that the shape of the icon capable of identifying the state of the peripheral device is not limited thereto and may vary.

FIG. 9 is a diagram illustrating a virtual space displaying an away GUI resource according to various embodiments.

The virtual space 300 of FIG. 9 may correspond to the virtual space 300 in the above-described figures. In the operation of displaying the virtual space 300 of FIG. 9, any discussions that may be redundant to those described above in connection with the figures may not be repeated. Some of the operations of displaying the virtual space 300 of FIG. 9 may be omitted. Operations not shown in FIG. 9 may be added.

The electronic device 200 may determine whether the distance to each peripheral device matched to the avatar part exceeds (or is greater than) a predetermined distance. Upon determining that the distance to the peripheral device exceeds the predetermined distance, the electronic device 200 may display the away GUI resource 900 on the avatar part matched with the peripheral device which may refer, for example, to the peripheral device being located outside the range for effective communication. In the illustrated example, when it is determined that the distance to the earphone matched to the head is greater than or equal to the predetermined distance, an away icon 900 may be displayed on the head part. The predetermined distance may be set based on a communication-capable range of the communication unit(s) 204 or may be set based on an external input, but is not limited thereto. It will be understood by one of ordinary skill in the art that the shape of the away GUI resource is not limited to the away icon 900 in the illustrated example and may vary.

The electronic device 200 may determine whether the distances to all the peripheral devices matched to the avatar parts exceed or are greater than the predetermined distance. Upon determining that the distances to all the devices exceed the predetermined distance, the electronic device 200 may display the away GUI resource in a predetermined position of the virtual space 300.

Figure 10:
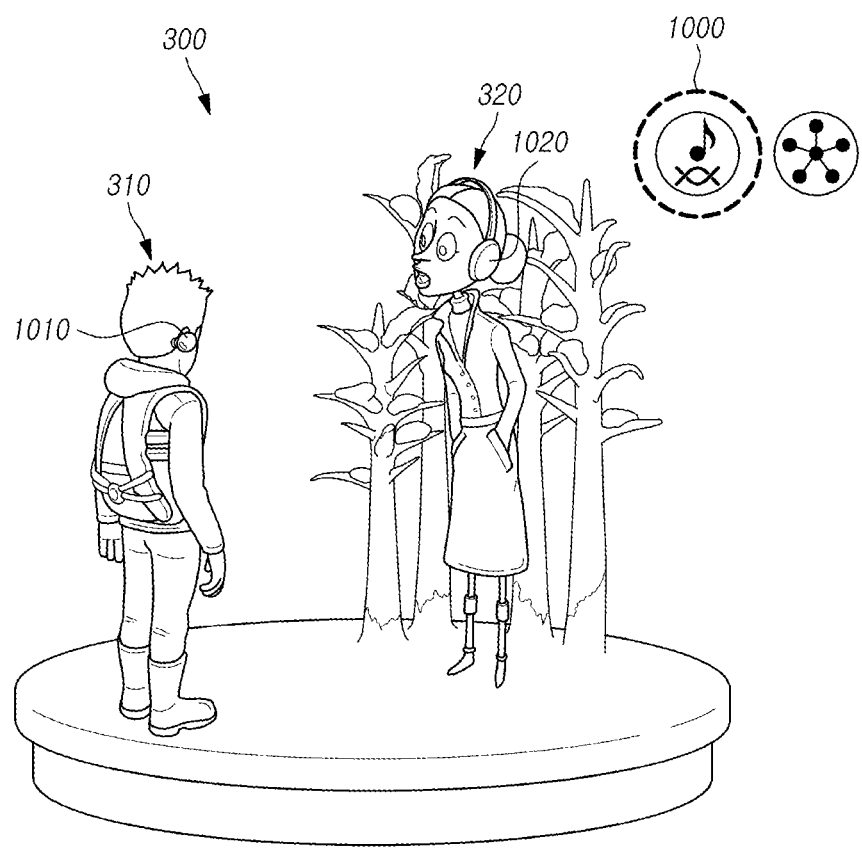
FIGS. 10, 11, and 12 are diagrams illustrating a virtual space displaying at least one function GUI resource capable of performing or stopping a predetermined function provided by a peripheral device according to various embodiments.
Figure 11:
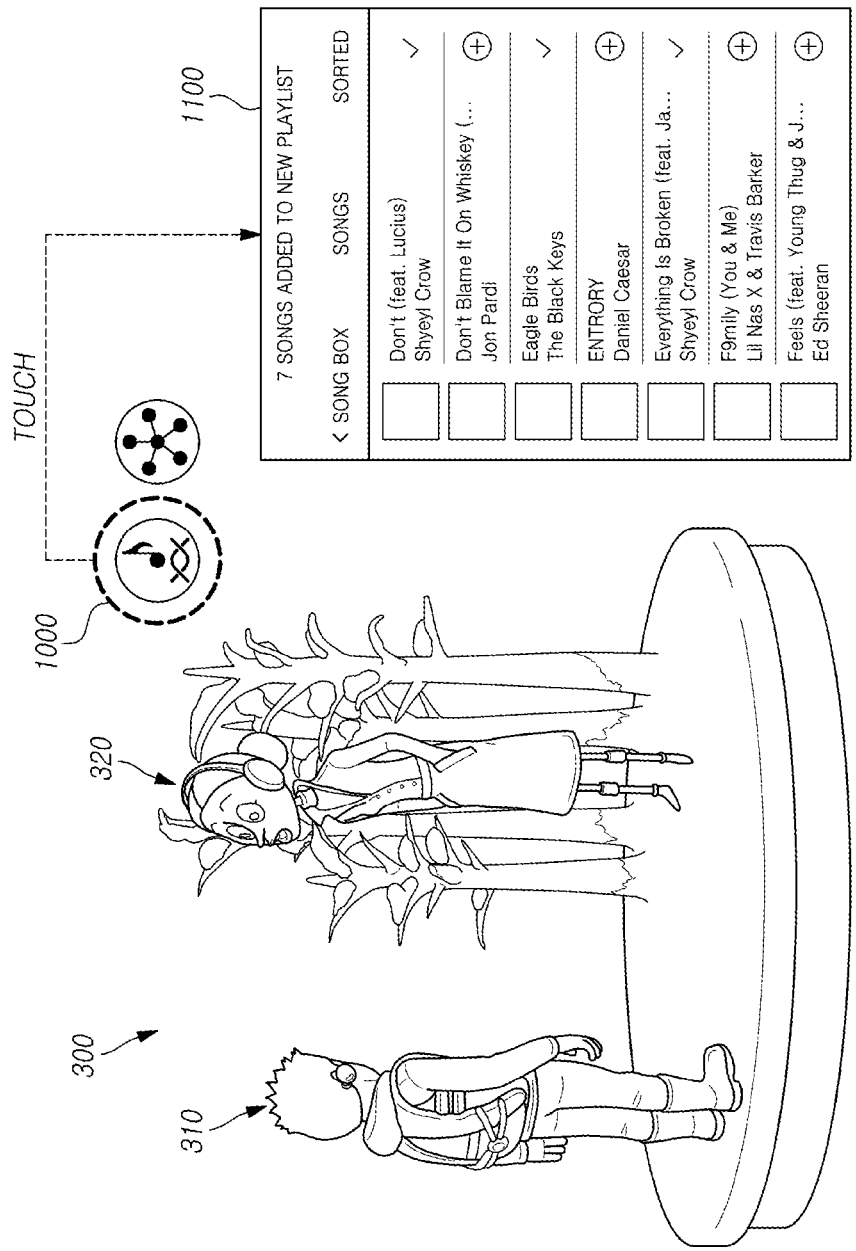
Figure 12:
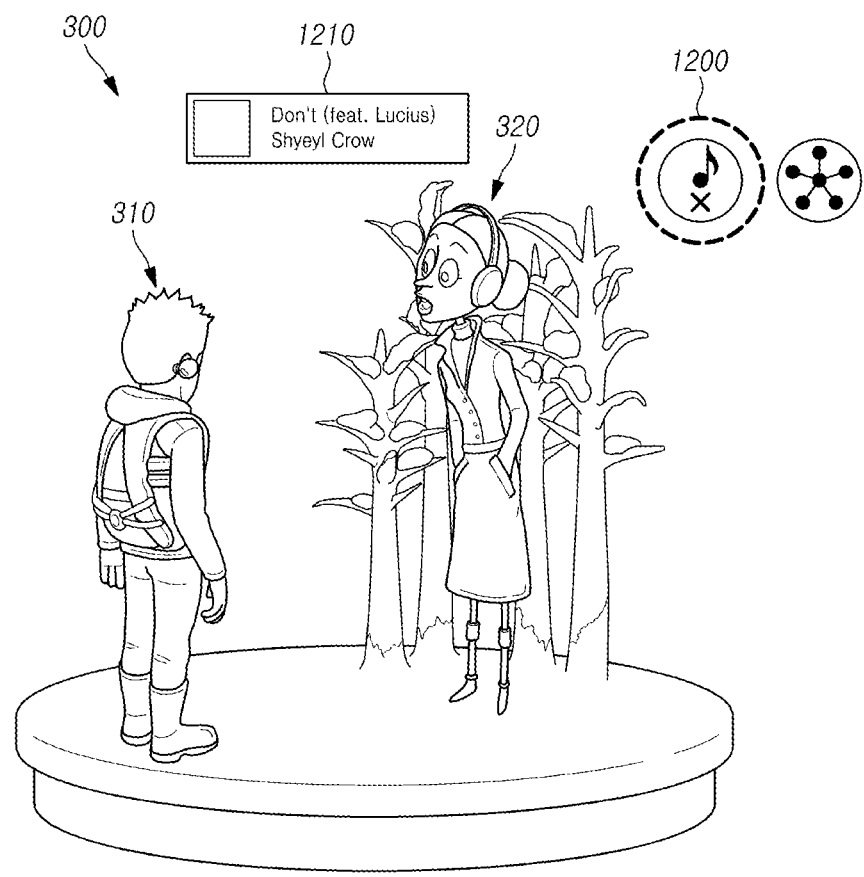

FIGS. 10, 11, and 12 are diagrams illustrating a virtual space displaying at least one function GUI resource capable of performing or stopping a predetermined function provided by a peripheral device according to various embodiments.

The virtual space 300 of FIGS. 10, 11 and 12 may correspond to the virtual space 300 in the above-described figures. In the operation of displaying the virtual space 300 of FIGS. 10, 11 and 12, any discussions that may be redundant to those described above in connection with the figures may not be repeated. Some of the operations of displaying the virtual space 300 of FIGS. 10, 11 and 12 may be omitted. Operations not shown in FIGS. 10, 11 and 12 may be added.

Referring to FIG. 10, the electronic device 200 may display a first avatar 310 including at least one avatar part in the virtual space 300. The first avatar 310 may correspond to the user of the electronic device 200. The electronic device 200 may display at least one second avatar 320 respectively corresponding to at least one participant (e.g., friend or family member) in the virtual space 300. For example, at least one participant may join the virtual space 300 based on a participant input and be invited to the virtual space 300 based on a user input of the electronic device 200. The virtual space 300 may, for example, be created/deleted/updated by an external device (e.g., server).

Each electronic device 200 corresponding to the user or participant may perform the operations described above in connection with FIGS. 3, 4 and 5, matching at least one peripheral device (e.g., earphone) to at least one avatar part (e.g., head) and displaying the peripheral device image for identifying the matched peripheral device on each of the at least one avatar part. Referring to FIG. 10, the electronic device 200 may match an earphone to the head part of the first avatar 310 and display the earphone image 1010 of the matched earphone on the head part.

Further, the electronic device 200 may obtain information about the at least one peripheral device matched to the at least one avatar part of the second avatar 320 from an external device (e.g., server) or the electronic device of the participant corresponding to the second avatar 320. The electronic device 200 may display a peripheral device image for identifying the matched peripheral device on each of the at least one avatar part of the second avatar 320 based on the obtained information. Referring to FIG. 10, the electronic device 200 may match a headphone to the head part of the first avatar 320 and display the headphone image 1020 of the matched headphone on the head part.

When the peripheral device has established connection with the electronic device 200, the electronic device 200 may display, in the virtual space 300, at least one function GUI resource capable of performing or stopping a predetermined function provided by the peripheral device. Referring to FIG. 10, where each of the earphone and the headphone has established connection to the user's electronic device 200 and the participant's electronic device, and music may be shared on the headphone, the electronic device 200 may display a music share icon 1000 for sharing music in the virtual space 300.

Referring to FIG. 11, based on a touch input to the music share icon 1000 from the user, the electronic device 200 may display a music list 1100 that may be shared to the peripheral device (e.g., headphone 320) of the second avatar 320 or the electronic device corresponding to the second avatar 320. The electronic device 200 may control to stream the music selected based on a user input to the electronic device corresponding to the second avatar 320 or the peripheral device of the second avatar 320. For example, the electronic device 200 may control to stream to the electronic device corresponding to the second avatar 320 or the peripheral device of the second avatar 320 through a predetermined streaming server or control to directly stream to the electronic device corresponding to the second avatar 320 or the peripheral device of the second avatar 320.

Referring to FIG. 12, the electronic device 200 may display the shared music-related information 1210 in the virtual space 300. The electronic device 200 may display a music share stop icon 1200 for stopping music sharing in the virtual space 300.

Figure 13:
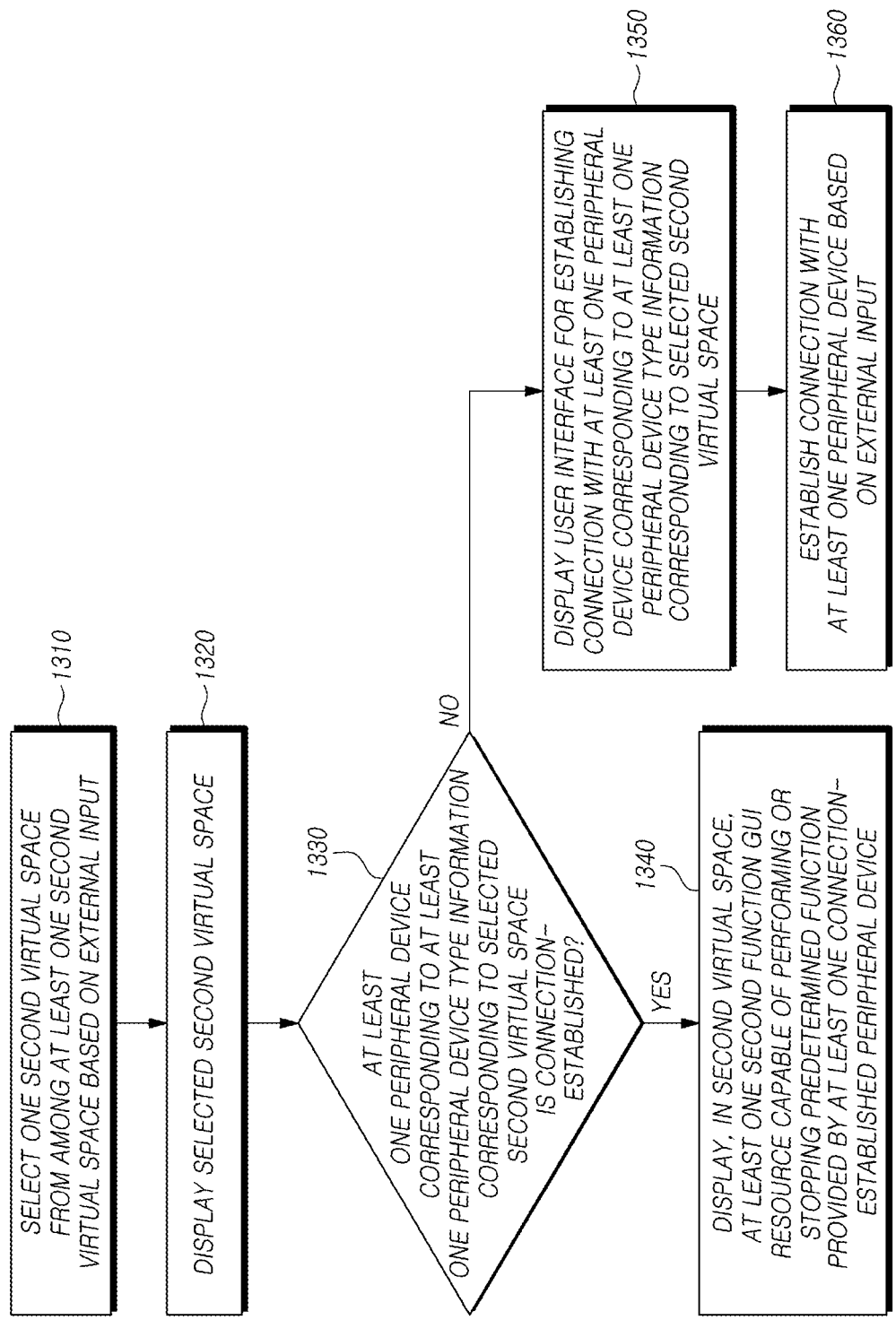
FIGS. 13 and 14 include a flowchart illustrating an example method for providing a user interface using an avatar and a diagram illustrating an example virtual space displayed, in performing a predetermined function provided by a peripheral device in a virtual space selected from among at least one virtual space according to various embodiments.
Figure 14:
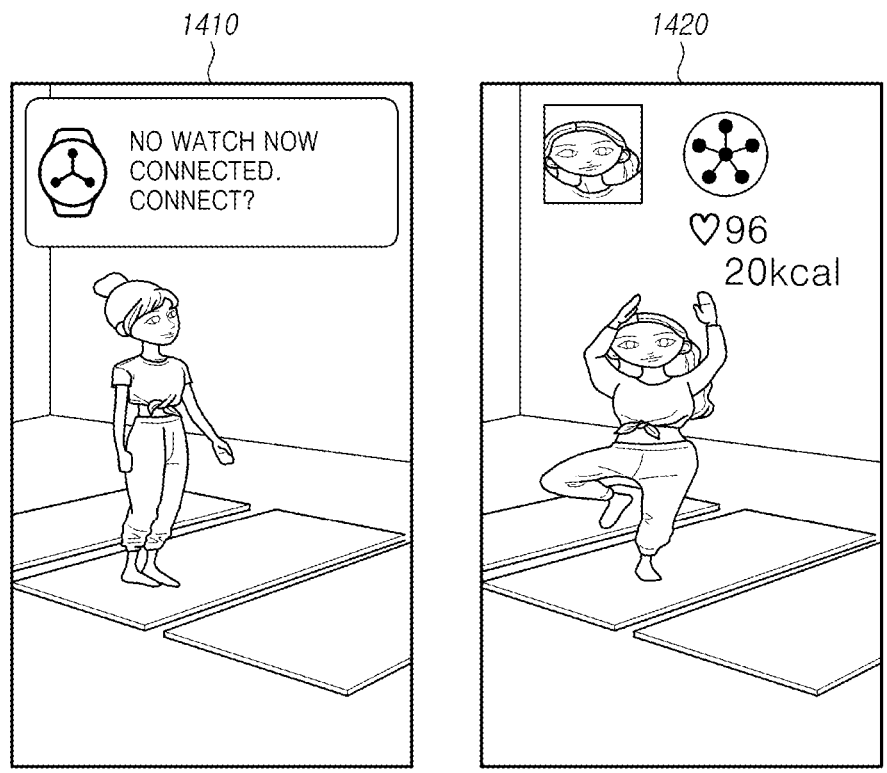

FIGS. 13 and 14 include a flowchart illustrating an example method for providing a user interface using an avatar and a diagram illustrating an example virtual space, in performing a predetermined function provided by a peripheral device in a virtual space selected from among at least one virtual space according to various embodiments.

In the operation of the electronic device of FIG. 13, the electronic device may be an electronic device corresponding to the electronic device 101 of FIG. 1 or the electronic device 200 of FIG. 2. In the operation of the electronic device disclosed in FIG. 13, any discussions that may be redundant to those described in connection with the above-described drawings, such as FIGS. 1 and 2, may not be repeated. Some of the operations of FIG. 13 may be omitted. Operations not shown in FIG. 13 may be added.

The electronic device 200 may generate a virtual space database including at least one second virtual space and at least one peripheral device type information corresponding to each second virtual space, based on an external input. The external input may include an input from the user or an input from an external device. For example, the electronic device 200 may create a virtual space database including a fitness virtual space and the peripheral device (e.g., watch) corresponding to the fitness virtual space as a database record.

Referring to FIG. 13, in operation 1310 according to an embodiment, the electronic device 200 may select one second virtual space among the at least one second virtual space based on an external input (e.g., user input). For example, the electronic device 200 may select the fitness virtual space based on a user input.

In operation 1320, the electronic device 200 may display the selected second virtual space. For example, the electronic device 200 may display the selected fitness virtual space based on the user input.

In operation 1330, the electronic device 200 may determine whether at least one peripheral device corresponding to at least one peripheral device type information corresponding to the selected second virtual space is in a connection-established state. When at least one peripheral device corresponding to at least one peripheral device type information corresponding to the selected second virtual space has established connection (Yes in operation 1330), the electronic device 200 may perform operation 1340, or otherwise (No in operation 1330), operation 1350. For example, the electronic device 200 may determine whether the peripheral device (e.g., watch) corresponding to the selected fitness virtual space has established connection.

In operation 1350, the electronic device 200 may display a user interface for establishing a connection with at least one peripheral device corresponding to at least one peripheral device type information corresponding to the selected second virtual space. The user interface for establishing a connection with the peripheral device may be configured to automatically establish a connection with the peripheral device or control manual connection. Referring to FIG. 14, when the peripheral device (e.g., watch) corresponding to the fitness virtual space does not have connection, the electronic device may display a user interface for establishing a connection with the peripheral device (e.g., watch) (1410).

In operation 1360, the electronic device 200 may establish a connection with at least one peripheral device based on an external input (e.g., user input).

In operation 1340, the electronic device 200 may display, in the second virtual space, at least one second function GUI resource capable of executing or stopping a predetermined function provided by the at least one connection-established peripheral device. The function GUI resource may include, but not limited to, a GUI resource capable of displaying the information obtained from the at least one peripheral device. Referring to FIG. 14, the electronic device 200 may display heartrate information and calorie information provided by the peripheral device (e.g., watch) in the virtual space (1420).

Figure 15:
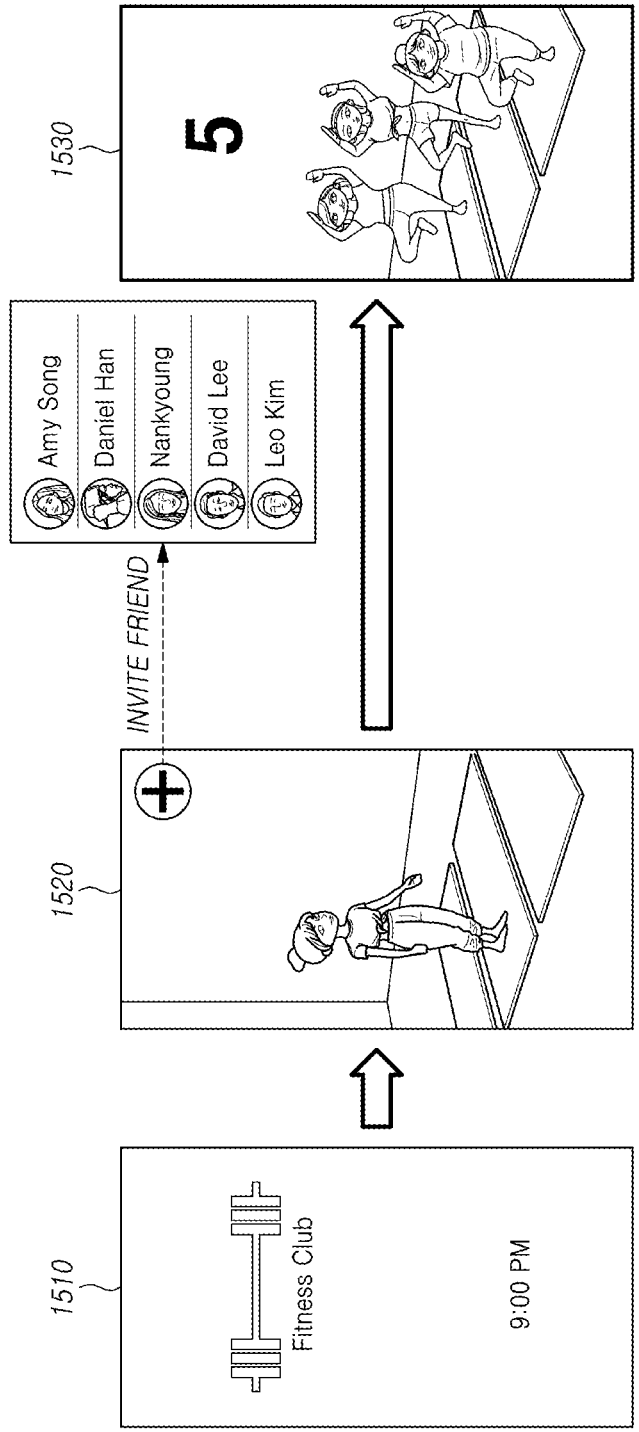
FIG. 15 is a diagram illustrating a virtual space where a friend is invited according to various embodiments.

FIG. 15 is a diagram illustrating a virtual space where a friend is invited according to various embodiments.

In the operation of the electronic device disclosed in FIG. 15, any discussions that may be redundant to those described in connection with the above-described drawings, such as FIGS. 13 and 14, may not be repeated. Some of the operations of FIG. 15 may be omitted. Operations not shown in FIG. 15 may be added.

The electronic device 200 may select one second virtual space among the at least one second virtual space based on an external input (e.g., user input). For example, the electronic device 200 may select the fitness virtual space based on a user input (1510).

The electronic device 200 may display the selected fitness virtual space. The electronic device 200 may display a first avatar corresponding to the user of the electronic device 200 in the fitness virtual space (1520).

The electronic device 200 may obtain or identify at least one participant (e.g., friend) joining the fitness virtual space based on an external input (e.g., user input). For example, at least one participant may join the fitness virtual space based on a participant input and be invited to the fitness virtual space based on a user input of the electronic device 200. The fitness virtual space may, for example, be created/deleted/updated by the electronic device 200 or an external device (e.g., server).

The electronic device 200 may display the first avatar and at least one second avatar corresponding to the at least one participant in the fitness virtual space (1530).

Figure 16:
FIG. 16 is a diagram illustrating a virtual space displaying at least one function GUI resource associated with a predetermined function provided by each peripheral device of an invited friend according to various embodiments.

FIG. 16 is a diagram illustrating a virtual space displaying at least one function GUI resource associated with a predetermined function provided by each peripheral device of an invited friend according to various embodiments.

The electronic device 200 may obtain information about at least one peripheral device corresponding to at least one participant, from an external device (e.g., server) or at least one participant's electronic device corresponding to the at least one second avatar joining the virtual space described above in connection with FIG. 15. The electronic device 200 may display at least one function GUI resource associated with a predetermined function, provided by each of at least one peripheral device corresponding to at least one participant, in the virtual space. The function GUI resource may include, but not limited to, a GUI resource capable of displaying the information obtained from the peripheral device corresponding to the at least one participant. The electronic device 200 may store the information obtained from the peripheral device corresponding to the at least one participant in the external device and provide various additional services based on the obtained information.

Referring to FIG. 16, the electronic device 200 may display heartrate information/calorie information provided by the peripheral device (e.g., first watch) of the user corresponding to the first avatar and heartrate information/calorie information provided by at least one peripheral device (e.g., second watch) of at least one participant respectively corresponding to at least one second avatar in the above-described fitness virtual space of FIG. 15.

According to an example embodiment of the disclosure, an electronic device performing communication using an avatar in a virtual space may comprise: a memory storing executable instructions and at least one processor electrically connected with the memory and capable of accessing the memory to execute the instructions. At least one processor may be configured to control a display to: display, in a virtual space, a first avatar corresponding to a user of the electronic device, display a first graphic user interface (GUI) resource that includes at least one device capable of communicating with the electronic device, and display a second GUI resource corresponding to the input device in a matching position of the first avatar based on receiving an input on the first GUI resource.

According to an example embodiment, the matching position of the first avatar may be a position where a device indicated by the second GUI resource is worn by the user.

According to an example embodiment, the at least one device may include at least one device which has paired with the electronic device, has been connected with the electronic device before, or has been pre-configured based on an external input. The first GUI resource may include at least one of an icon, text, or an object corresponding to at least one device. The second GUI resource may include at least one of an icon, text, or an object corresponding to the input device.

According to an example embodiment, the second GUI resource may further include a state GUI element capable of identifying a state of a device. The state of the device may include a state of being connected with the electronic device and a state of having no connection with the electronic device.

According to an example embodiment, the at least one processor may be configured to control the display to display, in a virtual space, at least one function GUI resource capable of executing or stopping a specified function provided by the device based on the device being connected to the electronic device.

According to an example embodiment, the at least one processor, based on external input, may be configured to: identify at least one participant joining the virtual space and at least one participant device and control the display to display, in the virtual space, at least one second avatar corresponding to the at least one participant and at least one third GUI resource corresponding to the at least one participant device.

According to an example embodiment, based on the device and the participant devices being earphones and the device being connected with the electronic device and being able to share music with the participant device, the at least one processor may be configured to control the display to display, in the virtual space, at least one of a music share icon capable of sharing music with the participant device, a sharable music list, information about music being shared, and a stop-share icon.

According to an example embodiment, based on the device being a watch, and the watch being connected with the electronic device, the at least one processor may be configured to control the display to display, in the virtual space, at least one of exercise heartrate information provided by the watch and information about calorie consumed by the user.

According to an example embodiment, the state GUI element may include at least one of a color of an avatar part matched with a device, a brightness of at least one of an icon, text, or an object corresponding to the device, and an icon capable of identifying the state of the device.

According to an example embodiment, the electronic device may further comprise: a communication unit comprising communication circuitry configured to communicate with the at least one device. The at least one processor may be configured to: determine whether a distance to each device matched to an avatar part is greater than a specified distance using the communication unit, and based on determining that the distance to the device is greater than the specified distance, control the display to display an away GUI resource on the avatar part matched to the device.

According to an example embodiment, the at least one processor may be configured to create a virtual space database, based on external input, including at least one second virtual space and at least one piece of device type information corresponding to each second virtual space.

According to an example embodiment, the at least one processor may be configured to: select one second virtual space among the at least one second virtual space based on an external input, control the display to display the selected second virtual space, determine whether at least one device corresponding to at least one piece of device type information corresponding to the selected second virtual space is connected, and based on the at least one device being connected, control the display to display, in the second virtual space, at least one fourth function GUI resource capable of executing or stopping a specified function provided by the at least one device.

According to an example embodiment, a method for communication using an avatar in a virtual space may comprise detecting or pairing at least one device capable of establishing connection with an electronic device. The method may comprise displaying, in a virtual space, a first avatar corresponding to a user of the electronic device. The method may comprise displaying a first GUI resource including the at least one device capable of establishing connection with the electronic device. The method may comprise, based on receiving an input on the first GUI resource, displaying a second GUI resource corresponding to the input device in a matching position of the first avatar.

According to an example embodiment, the matching position of the first avatar may be a position where a device indicated by the second GUI resource is worn by the user.

According to an example embodiment, the at least one device may include at least one device which has paired with the electronic device, has been connected with the electronic device before, or has been pre-configured based on an external input. The first GUI resource may include at least one of an icon, text, or an object corresponding to the at least one device. The second GUI resource may include at least one of an icon, text, or an object corresponding to the input device.

According to an example embodiment, the second GUI resource may further include a state GUI element capable of identifying a state of a device. The state of the device may include a state of being connected with the electronic device and a state of not being connected with the electronic device.

According to an example embodiment, the method may comprise identifying, based on external input, at least one participant joining the virtual space and at least one participant device based. The method may comprise displaying, in the virtual space, at least one second avatar corresponding to the at least one participant and at least one third GUI resource corresponding to the at least one participant device.

According to an example embodiment, the method may comprise, based on the device and the participant devices being earphones and the device being connected with the electronic device and being able to share music with the participant device, displaying, in the virtual space, at least one of a music share icon capable of sharing music with the participant device, a sharable music list, information about music being shared, and a stop-share icon.

According to an example embodiment, the method may comprise, based on the device being a watch, and the watch being connected with the electronic device, displaying, in the virtual space, at least one of exercise heartrate information provided by the watch and information about calorie consumed by the user.

According to an example embodiment, the state GUI element may include at least one of a color of an avatar part matched with a device, a brightness of at least one of an icon, text, or an object corresponding to the device, and an icon capable of identifying a state of the device.

The electronic device according to various embodiments of the disclosure may be one of various types of electronic devices. The electronic devices may include a display device, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another and does not limit the components in other aspect (e.g., importance or order).

As used herein, the term "part" or "module" may include a unit implemented in hardware, software, or firmware, or any combination thereof, and may interchangeably be used with other terms, such as "logic," "logic block," "part," or "circuitry". A part or module may be a single integral component, or a minimum unit or part thereof, adapted to perform one or more functions. For example, according to an embodiment, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the electronic device 200 and peripheral device 210 described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in a non-transitory computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device configured to communicate using an avatar in a virtual space, the electronic device comprising:
    memory storing executable instructions; and
    at least one processor electrically connected with the memory and configured to access the memory to execute the instructions and cause the electronic device to perform operations comprising:
        controlling a display to display a first avatar corresponding to a user of the electronic device in a virtual space, the first avatar including at least one peripheral electronic device matching graphic user interface (GUI) resource each displayed on a respective first avatar part;
        based on an input for selecting a peripheral electronic device matching GUI resource, controlling the display to display a peripheral electronic device selecting GUI resource including at least one peripheral electronic device capable of establishing a communication connection with the electronic device;
        based on receiving an input selecting a peripheral electronic device using the peripheral electronic device selecting GUI resource, controlling the display to display a peripheral electronic device GUI resource selected according to the input at the corresponding first avatar part; and
        outputting, in the virtual space, information provided over the communication connection by the selected peripheral electronic device.

2. The electronic device of claim 1, wherein the corresponding first avatar part corresponds to a body part at which the peripheral electronic device is worn by the user.

3. The electronic device of claim 1, wherein, based on the peripheral electronic device being a watch and the watch being connected with the electronic device, at least one processor is configured to cause the electronic device to perform operations comprising controlling the display to display, in the virtual space, at least one of exercise heartrate information provided by the watch or information about calories consumed by the user.

4. The electronic device of claim 1, further comprising communication circuitry configured to communicate with the at least one peripheral electronic device, wherein at least one processor is configured to cause the electronic device to perform operations comprising:
    determining whether a distance to each peripheral electronic device corresponding to an avatar part is greater than a specified distance, using the communication circuitry; and
    upon determining that the distance to one of the peripheral electronic devices is greater than the specified distance for the respective peripheral electronic device, controlling the display to display an away GUI resource on the avatar part corresponding to the respective peripheral electronic device.

5. The electronic device of claim 1, wherein at least one processor is configured to cause the electronic device to perform operations comprising generating a virtual space database, based on external input, including at least one second virtual space and at least one piece of peripheral electronic device type information corresponding to each second virtual space.

6. The electronic device of claim 5, wherein at least one processor is configured to cause the electronic device to perform operations comprising:
    selecting one second virtual space among the at least one second virtual space based on an input to the electronic device;
    controlling the display to display the selected second virtual space;
    determining whether at least one peripheral electronic device corresponding to at least one piece of peripheral electronic device type information corresponding to the selected second virtual space has an established communication connection; and based on the at least one peripheral electronic device having an established communication connection, controlling the display to display at least one other function GUI resource capable of executing or stopping a specified function provided by the at least one peripheral electronic device in the second virtual space.

7. The electronic device of claim 1, wherein at least one processor is configured to cause the electronic device to perform operations comprising:
   identifying at least one participant joining the virtual space and at least one participant electronic device based on an external input; and
   controlling the display to display at least one second avatar corresponding to the at least one participant and at least one other GUI resource corresponding to the at least one participant electronic device in the virtual space.

8. The electronic device of claim 7, wherein, based on the peripheral electronic device and the participant electronic device including earphones and the peripheral electronic device being connected with the electronic device and being able to share music with the participant electronic device, at least one processor is configured to cause the electronic device to perform operations comprising controlling the display to display at least one of a music share icon for sharing music with the participant device, a sharable music list, information about music being shared, or a stop-share icon in the virtual space.

9. The electronic device of claim 1, wherein the at least one peripheral electronic device includes at least one electronic device, which has paired with the electronic device, has been connected with the electronic device previously, or has been pre-configured based on an external input,
   wherein the peripheral electronic device selecting GUI resource includes at least one of an icon, text, or an object corresponding to the at least one peripheral electronic device, and
   wherein the peripheral electronic device GUI resource includes at least one of an icon, text, or an object corresponding to the selected peripheral electronic device.

10. The electronic device of claim 9, wherein the peripheral electronic device GUI resource further includes a state GUI element capable of identifying a state of the peripheral electronica device, and
    wherein the state of the peripheral electronic device includes a state of being connected with the electronic device and a state of not being connected with the electronic device.

11. The electronic device of claim 10, wherein at least one processor is configured to cause the electronic device to perform operations comprising controlling the display to display at least one function GUI resource capable of executing or stopping a specified function provided by the peripheral electronic device in the virtual space based on the peripheral electronic device being connected with the electronic device.

12. The electronic device of claim 10, wherein the state GUI element includes at least one of a color of an avatar part corresponding to the peripheral electronic device, a brightness of at least one of an icon, text, or an object corresponding to the peripheral electronic device, or an icon capable of identifying a state of the peripheral electronic device.

13. A method for communication using an avatar in a virtual space, the method comprising:
    detecting or pairing at least one peripheral electronic device capable of establishing a communication connection with an electronic device;
    displaying a first avatar corresponding to a user of the electronic device in a virtual space, the first avatar including at least one peripheral electronic device matching graphic user interface (GUI) resource each displayed on a respective first avatar part;
    based on an input for selecting a peripheral electronic device matching GUI resource, displaying a peripheral electronic device selecting GUI resource including the at least one peripheral electronic device capable of establishing the communication connection with the electronic device;
    based on receiving an input selecting a peripheral electronic device using the peripheral electronic device selecting GUI resource, displaying a peripheral electronic device GUI resource selected according to the input at the corresponding first avatar part; and
    outputting, in the virtual space, information provided over the communication connection by the selected peripheral electronic device.

14. The method of claim 13, wherein the corresponding first avatar part corresponds to a body part at which the peripheral electronic device is worn by the user.

15. The method of claim 13, further comprising, based on the peripheral electronic device being a watch, and the watch being connected with the electronic device, displaying, in the virtual space, at least one of exercise heartrate information provided by the watch or information about calories consumed by the user.

16. The method of claim 13, further comprising:
    identifying at least one participant joining the virtual space and at least one participant electronic device based on an external input; and
    displaying at least one second avatar corresponding to the at least one participant and at least one other GUI resource corresponding to the at least one participant electronic device in the virtual space.

17. The method of claim 16, further comprising, based on the peripheral electronic device and the participant electronic device including earphones, and the peripheral electronic device being connected with the electronic device and being able to share music with the participant electronic device, displaying, in the virtual space, at least one of a music share icon for sharing music with the participant device, a sharable music list, information about music being shared, or a stop-share icon.

18. The method of claim 13, wherein the at least one peripheral electronic device includes at least one electronic device which has paired with the electronic device, has been connected with the electronic device previously, or has been pre-configured based on an external input,
    wherein the peripheral electronic device selecting GUI resource includes at least one of an icon, text, or an object corresponding to the at least one peripheral electronic device, and
    wherein the peripheral electronic device GUI resource includes at least one of an icon, text, or an object corresponding to the selected peripheral electronic device.

19. The method of claim 18, wherein the peripheral electronic device GUI resource further includes a state GUI element capable of identifying a state of the peripheral electronica device, and wherein the state of the peripheral electronic device includes a state of being connected with the electronic device and a state of not being connected with the electronic device.

20. The method of claim 19, wherein the state GUI element includes at least one of a color of an avatar part corresponding to the peripheral electronic device, a brightness of at least one of an icon, text, or an object corresponding to the peripheral electronic device, or an icon capable of identifying a state of the peripheral electronic device.

* * * * *